(12) United States Patent
Corre et al.

(10) Patent No.: US 10,067,247 B2
(45) Date of Patent: Sep. 4, 2018

(54) METHOD FOR IDENTIFYING AN ISOTOPE, PROGRAM FOR IDENTIFYING AN ISOTOPE AND DEVICE FOR IDENTIFYING ISOTOPES

(71) Applicant: COMMISSARIAT A L'ENERGIE ATOMIQUE ET AUX ENERGIES ALTERNATIVES, Paris (FR)

(72) Inventors: Gwenole Corre, Saint-Aubin (FR); Karim Boudergui, Nogent-le-Phaye (FR); Vladimir Kondrasovs, Palaiseau (FR); Guillaume Sannie, Issy les Moulineaux (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/519,198

(22) PCT Filed: Oct. 21, 2015

(86) PCT No.: PCT/EP2015/074392
§ 371 (c)(1),
(2) Date: Apr. 14, 2017

(87) PCT Pub. No.: WO2016/062775
PCT Pub. Date: Apr. 28, 2016

(65) Prior Publication Data
US 2017/0234997 A1    Aug. 17, 2017

(30) Foreign Application Priority Data
Oct. 22, 2014 (FR) ...................................... 14 60162

(51) Int. Cl.
*G01T 1/36* (2006.01)
(52) U.S. Cl.
CPC .................................. *G01T 1/362* (2013.01)

(58) Field of Classification Search
CPC .................................. G01T 1/362; G01T 1/36
See application file for complete search history.

(56) References Cited

U.S. PATENT DOCUMENTS

2005/0029460 A1    2/2005  Iwatschenko-Borho et al.
2006/0036425 A1    2/2006  Le Cocq et al.
(Continued)

FOREIGN PATENT DOCUMENTS

WO    2006/036425 A2    4/2006
WO    2014/016550 A1    1/2014

OTHER PUBLICATIONS

International Search Report dated Jan. 4, 2016 in PCT/EP2015/074392 filed Oct. 21, 2015.
(Continued)

*Primary Examiner* — David Porta
*Assistant Examiner* — Faye Boosalis
(74) *Attorney, Agent, or Firm* — Oblon, McClelland, Maier & Neustadt, L.L.P.

(57) ABSTRACT

A method and system to identify an isotope provided in a medium to be characterized by an instrumentation system. The identification method includes: measuring at least one reference spectrum for at least two reference isotopes; defining measurement windows for each reference isotope; measuring a measured spectrum on the medium to be characterized; for each reference isotope, calculating for each of the measurement windows a deviation value representing the deviation between the measured spectrum and that of the reference isotope in the measurement window; for each reference isotope, determining from the calculated deviation values a dissimilarity coefficient; and identifying the isotope from the determined dissimilarity coefficients.

13 Claims, 2 Drawing Sheets

(56) References Cited

U.S. PATENT DOCUMENTS

2007/0108379 A1    5/2007  Rowland et al.
2008/0011962 A1    1/2008  Russ
2015/0316665 A1    11/2015 Ramsden

OTHER PUBLICATIONS

French Search Report dated Jul. 27, 2015 in FR 1460162 filed Oct. 22, 2014.
Schonfeld, E. et al., "Determination of Nuclide Concentrations in Solutions Containing Low Levels of Radioactivity by Least-Squares Resolution of the Gamma-Ray Spectra," Nuclear Instruments and Methods, vol. 45, No. 1, Nov. 1966, XP001440458, pp. 1-21.
Ely, J. et al., "The use of energy information in plastic scintillator material," Journal of Radioanalytical and Nuclear Chemistry, vol. 276, No. 3, 2008, pp. 743-748.
Burr, Tom et al., "Data Mining in Radiation Portal Monitoring," International Journal of Research and Reviews in Applied Science, vol. 17, Issue 1, Nov. 2013, pp. 1-8.
U.S. Appl. No. 13/380,809, filed Mar. 6, 2012, US 2012/0166120 A1, Gwenole Corre et al.
U.S. Appl. No. 14/915,956, filed Mar. 2, 2016, US 2016/0282481 A1, Guillaume Sannie et al.
U.S. Appl. No. 14/761,466, filed Jul. 16, 2015, US 2015/0346352 A1, Romain Coulon et al.
U.S. Appl. No. 14/759,014, filed Jul. 2, 2015, US 2015/0346362 A1, Vladimir Kondrasovs et al.
U.S. Appl. No. 15/302,122, filed Oct. 5, 2016, Mathieu Thevenin et al.
U.S. Appl. No. 15/315,628, filed Dec. 1, 2016, Sylvain Magne.
U.S. Appl. No. 13/579,016, filed Aug. 14, 2012, US 2012/0318998 A1, Vladimir Kondrasovs et al.

METHOD FOR IDENTIFYING AN ISOTOPE, PROGRAM FOR IDENTIFYING AN ISOTOPE AND DEVICE FOR IDENTIFYING ISOTOPES

TECHNICAL FIELD

The invention relates to the field of nuclear instrumentation and identification of radioactive isotope by means of a system for measuring ionising radiations, and more particularly relates to measurement systems using low density detectors such as plastic scintillators.

STATE OF PRIOR ART

Whether for safety checks in airports or in some sensitive places, or even for customs controls in commercial ports, the development of radioactive isotope detectors which are both sensitive, large and with reasonable costs generally involves low density scintillators such as plastic scintillators.

Indeed, this type of scintillator, also called organic scintillator, has the advantage to provide a high detection volume for reasonable costs. These scintillators thus allow the development of detectors the size and sensitivity of which are sufficient to inspect the inside of containers without having to empty them. It is thus possible, even in the industrial context of large commercial ports, to check import of prohibited radioactive products.

However, the development of system for measuring ionising radiations using low density scintillators remains limited because of significant drawbacks. Indeed, energy spectra provided by these measurement systems have a particularly degraded spectral resolution, and which is all the more degraded that the detectors used are predominantly sensitive to Compton diffusion phenomena. Thus, the interpretation of these spectra in order to determine the presence of a particular isotope remains difficult and consequently, this type of measurement system is generally used for the detection of radioactive material without identification of the isotope type. Thus, with such systems, it is not infrequent that the presence of natural radiations, such as in naturally occurring radioactive materials, known as NORM, can cause false positives.

To overcome these drawbacks, it is known to implement methods for identifying spectra to remove false positives. For example, one can mention works of Ely. J. and co-authors which are published in the scientific review "Journal of Radioanalytical and Nuclear Chemistry" Volume 276 number 3 pages 743-748 published in 2008 and which relate to a method for analysing scintillation spectra to discriminate the origin of radiations detected.

This method developed by Ely J. and co-authors consists in performing a measurement of scintillation spectrometry and cutting the spectrum thus obtained into two measurement windows, the first one corresponding to low energies and the other one corresponding to high energies. The spectrum is then integrated on each of the windows to determine a number of incidences of the low energy radiations and a number of incidences of the high energy radiations and calculate the ratio between both these numbers of incidences. Indeed, Ely J. and co-authors have demonstrated that if the measured amount of radiations did not enable natural radiations to be discriminated from those from prohibited radioactive products, the ratio between the number of incidence of high energy radiations with that of low energy radiations is on the other hand more specific.

By "number of incidences at a given energy", it is meant above and in the rest of the document, the number of particles, such as photons, gamma, neutrons or even alpha particles, detected with said energy. By extension, the number of incidences in an energy range, such as that of high energy radiations, and the measured amount of radiation, are respectively understood as the number of particles detected in said energy range and in the measurement range.

Thus, such a method makes it possible by this calculation of incidence ratio to remove a significant part of the false positives and thus to identify the presence of some types of prohibited radioactive products which have specific incidence ratios. However, if such a method is relatively simple to implement, it makes it possible to identify the presence of only part of the isotopes without enabling the detected isotope to be precisely identified.

It is also known, in particular, from the works of Tom Burr and co-authors published in the scientific review "International Journal of Research and Reviews in Applied Science" volume 17 issue 1 pages 1-8, to solve this problem by making a comparison of patterns by means of neural networks. Such a method enables an identification of isotopes to be achieved, after a long learning phase by means of a great number of spectra of reference isotopes.

However, such a method is not always appropriate. Indeed, it is relatively long to implement because of the learning phase and a simple measurement environment disturbance, such as a partial screening, can, by modifying the patterns of the spectrum it causes, compromise the identification.

DISCLOSURE OF THE INVENTION

One object of the invention is to solve at least partially these drawbacks and one purpose of the invention is thus to provide a method for identifying isotopes by scintillation spectroscopy which is simple to implement while being robust to allow the isotope to be identified even in the presence of an environment disturbance.

The invention more particularly aims at providing systems for measuring ionising radiations using low density scintillators such as plastic scintillators.

To that end, the invention relates to an identification method for identifying an isotope present in a medium to be characterised by a measurement system for measuring energy-resolved ionising radiations, the identification method including the following steps of:

E1 measuring at least one reference spectrum for at least two reference isotopes, E2 normalising the reference spectra, E3 delimiting for each reference isotope measurement windows in the reference spectrum of said isotope, E4 measuring a measured spectrum on the medium to be characterised, E5 normalising the measured spectrum, E6 for each reference isotope, delimiting in the measured spectrum measurement windows identical to those delimited for said reference isotope and calculating for each of the measurement windows a deviation value which is representative of the deviation between the measured spectrum and that of the reference isotope in said measurement window, E7 for each reference isotope, determining from the deviation values calculated for said reference isotope an identity coefficient, E8 identifying the isotope from the determined identity coefficients.

During step E3 of delimiting for each reference isotope measurement windows, the width of the measurement windows is dependent on the reference spectrum of the reference isotope.

Such a detection method makes it possible from reference spectra to obtain an identification of the isotope even if it is placed in a disturbed environment, such as in the presence of a screening. Indeed, it makes it possible from a high number of measurements, provided by the measurement windows, to identify the reference isotope the identity of which is the closest to the isotope to be identified. Thus, even in a disturbed environment, the determination of the identity coefficients is degraded, this degradation being substantially identical for all the identity coefficients, the identification remains possible. This method thus makes it possible to provide a simple and robust isotope identification even with systems for measuring ionising radiations using detectors having inherently a low energy resolution such as low density scintillators.

Furthermore, with the dependence of the width of the measurement windows, it is possible to take features relative to the characterisation of each of the reference isotopes into account and to take the same features into account upon comparing the measured spectrum and reference spectra. Indeed, the comparison between the measured spectrum and one of the reference spectra is made based on the same measurement windows. In this way, it is possible to optimise the recognition of the isotope to be identified by specially taking specific problems to each reference isotope, such as the presence of the Compton peak, into account.

The measurement system can be of the type using low density scintillators such as plastic scintillators, step E3 of determining measurement windows for each reference isotope can include the following sub-steps of:
 E31 determining from the reference spectrum of the reference isotope a Compton peak width,
 E32 determining from the value of the determined Compton peak width a window width, the window width being preferentially equal to the Compton peak width.

The use of the Compton peak width makes it possible to take Compton diffusion phenomena into account independently for each of the reference isotopes. Indeed, the Compton peak is perfectly representative of the resolution loss related to Compton diffusion. Thus, for each of the reference isotopes, measurement windows are obtain, offering values perfectly representative because they take the resolution loss inherent to the Compton diffusion phenomenon into account.

Sub-step E31 of determining a Compton peak width can consist in:
 E31 determining in the reference spectrum an energy range having a minimum derivative, the width of said energy range corresponding to the Compton peak width.

The step of determining measurement windows for each reference isotope in the reference spectrum of said isotope can comprise, after at least one sub-step of setting or determining a window width, the following sub-steps of:
 E33 defining N measurement points in said reference spectrum, N being an integer higher than or equal to 2, said measurement points being preferentially common to all of the reference isotopes,
 E34 determining for each of the measurement points a measuring window centred on said measurement point and the width of which is the window width set beforehand.

With such a determination of the measurement windows, it is possible to obtain for each of the isotopes N reference values which can be taken as the N coordinates of an identification vector. A representation can thus be obtained facilitating comparison with the measured spectrum.

Step E6 of delimiting in the measured spectrum measurement windows and calculating for each of the measurement windows a deviation value can include for each of the reference isotopes the following sub-steps of:
 E61 subtracting from the measured spectrum the reference spectrum of the reference isotope,
 E62 squaring the spectrum thus subtracted,
 E63 for each of the measurement windows, integrating on the measurement window the spectrum thus subtracted and squared so as to calculate the deviation value for said measurement window.

The identity coefficient can be a dissimilarity coefficient MaxD and step E7 of determining the dissimilarity coefficient MaxD can consist in:
 E7 calculating a dissimilarity coefficient MaxD relative to said reference isotope equal to the maximum value reached by the deviation values 21 calculated for said reference isotope,
step E8 then consisting in:
 E8 identifying from the determined dissimilarity coefficients MaxD the smallest one, the isotope present in the medium to be characterised being identified as being identical to the reference isotope to which this smallest dissimilarity coefficient corresponds.

The identity coefficient can be a resemblance coefficient MD and wherein step E7 of determining the resemblance coefficient MD can consist in:
 E7 calculating a resemblance coefficient MD relative to said reference isotope equal to the inverse of the maximum value reached by the deviation values calculated for said reference isotope to which a strictly positive calculation constant has been added beforehand,
step E8 consisting then in:
 E8 identifying from the determined resemblance coefficients MD the greatest one, the isotope being identified as being identical to the reference isotope to which this greatest resemblance coefficient corresponds.

Such dissimilarity and resemblance coefficients allow a ready comparison to identify the reference spectrum to which the isotope to be identified corresponds. Indeed, a simple comparison of the coefficients makes it possible to identify the isotope present in the medium to be characterised consequently. The complexity of systems with neural networks used in prior art is thus avoided.

Step E8 of identifying the isotope can be a step of identifying the major isotope and it can is further be provided a further step E9 of identifying at least one other isotope.

Step E9 of identifying at least one other isotope comprises the following sub-steps of:
 E91 setting an identity coefficient threshold value,
 E92 determining, by comparing the identity coefficients determined in step E7 to said identity coefficient threshold value, which are the other isotope(s) present in the medium to be characterised other than that identified in step E8.

With such steps E9, it is possible to identify most of the isotopes located in the medium to be characterised.

A step E4' is provided consisting in:
 E4' detecting the presence of at least one isotope in the medium to be characterised.

Such a step E'4 makes it possible to make the method autonomous because can be implemented even on media to be characterised in which the presence of a radioactive isotope is only suspected.

The invention also relates to a device for identifying isotopes, which is adapted to identify an isotope in a medium to be characterised and comprising:
- a measurement system for measuring energy-resolved ionising radiations adapted to measure energy spectra,
- a control and monitor unit configured to control and monitor the measurement system, the control and monitor unit being configured to control the measurement system in order to perform an identification method according to the invention.

Such an isotope identification device, in the implementation of a method according to the invention, makes it possible to benefit from the advantages related to the invention.

The invention also relates to a computer program including instructions for implementing the method according to the invention when said program is implemented by a computer forming a control and monitor unit of a measurement system according to the invention.

Such a program enables to benefit from advantages related to the method of the invention with a simple implementation.

BRIEF DESCRIPTION OF THE DRAWINGS

The present invention will be better understood upon reading the description of exemplary embodiments, given by way of purely indicating and in no way limiting purposes, with reference to the appended drawings in which.

Identical, similar or equivalent parts of the different figures bear the same reference numerals so as to facilitate switching from one figure to the other.

The different parts represented in the figures are not necessarily drawn to a uniform scale, to make figures more legible.

Different possibilities (alternatives) should be understood as being not mutually exclusive and can be combined to each other.

DETAILED DISCLOSURE OF PARTICULAR EMBODIMENTS

Figure 1:
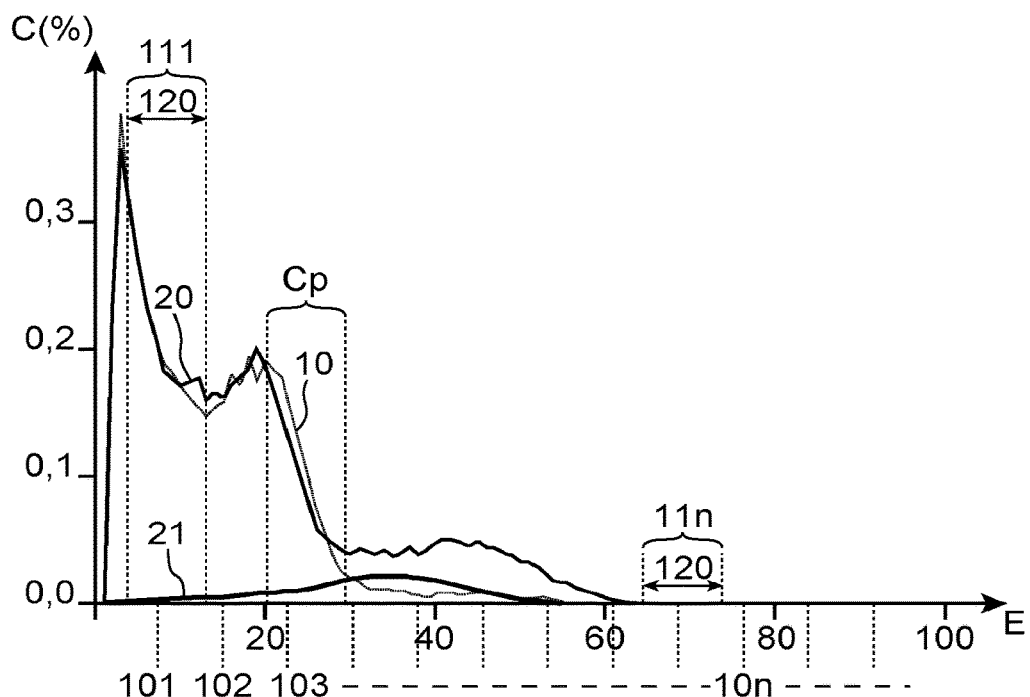
FIG. 1 illustrates an example of reference and measured spectra and the deviation values obtained upon implementing a method according to the invention, FIG. 2 schematically illustrates a measurement system using scintillation detectors allowing the implementation of a method according to the invention.

FIG. 1 illustrates two examples of energy spectra obtained by virtue of a system for measuring energy-solved ionising radiations using plastic scintillators, the first being a reference spectrum 10 measured on a reference isotope, the other being a measured spectrum 20 of an isotope 310 to be identified and present in a medium to be characterised 300, such as a container or the inside of an inspection chamber of a luggage inspection system, by means of an identification method according to the invention.

Such an identification method is intended to be implemented by means of a measurement system 200 for measuring ionising radiations. This identification method is particularly suitable for systems for measuring ionising radiations of the type which uses low density detectors such as plastic scintillators or even with organic liquids which are subjected to Compton effect. This scintillator type is more generally known as an organic scintillator.

Of course, this identification method is not limited to an implementation of a measurement system 200 for measuring ionising radiations of the type which uses low density detectors, it can also be implemented on a system for measuring energy-solved ionising radiations not using the scintillation principle such as those implementing a photocathode.

Figure 2:
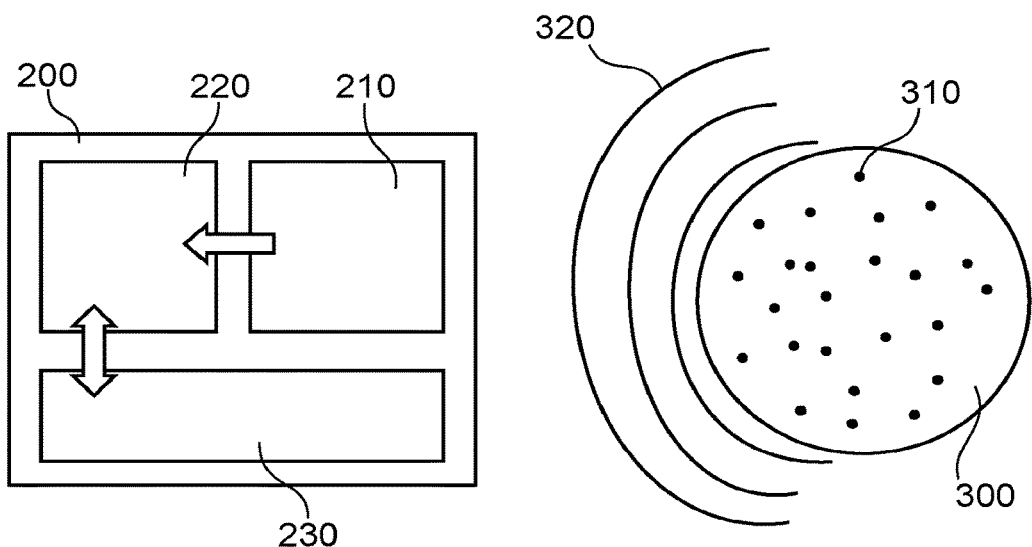

Such a measurement system 200 generally comprises, as depicted in FIG. 2, a scintillation medium 210 which has fluorescence properties with radioactive radiations 320 and a photomultiplier 220 suitable for detecting the fluorescence radiation from the scintillation medium, the photomultiplier 220 being coupled to a device making it possible to represent the energy deposited into the scintillation medium 210. The measurement system 200 further includes a control and monitor unit 230 suitable for controlling and monitoring the photomultiplier for the implementation of the identification method according to the invention.

According to a conventional configuration, the control and monitor unit 230 can be a computer configured by means of a computing program. Such a computing program includes instructions for implementing the method according to the invention when implemented on the computer.

To result in the identification of the isotope 310 present in the medium to be characterised from said measured spectrum 20, the identification method includes, as illustrated in FIG. 2, the following steps of:
- E1 measuring at least one reference spectrum 10 for at least two reference isotopes,
- E2 normalising the reference spectra 10, E3 delimiting for each reference isotope measurement windows 111, 11n in the reference spectrum 10 of said reference isotope,
- E4 measuring a measured spectrum 20,
- E5 normalising the measured spectrum,
- E6 for each reference isotope, delimiting in the measured spectrum 20 measurement windows 111, 11n identical to those delimited for said isotope and calculating for each of the measurement windows 111, 11n a deviation value 21 which is representative of the deviation between the measured spectrum and that of the reference isotope in said measurement window 111, 11n,
- E7 for each reference isotope, determining from the deviation values 21 calculated for said reference isotope an identity coefficient,
- E8 identifying the isotope from the determined identity coefficients.

Figure 3:
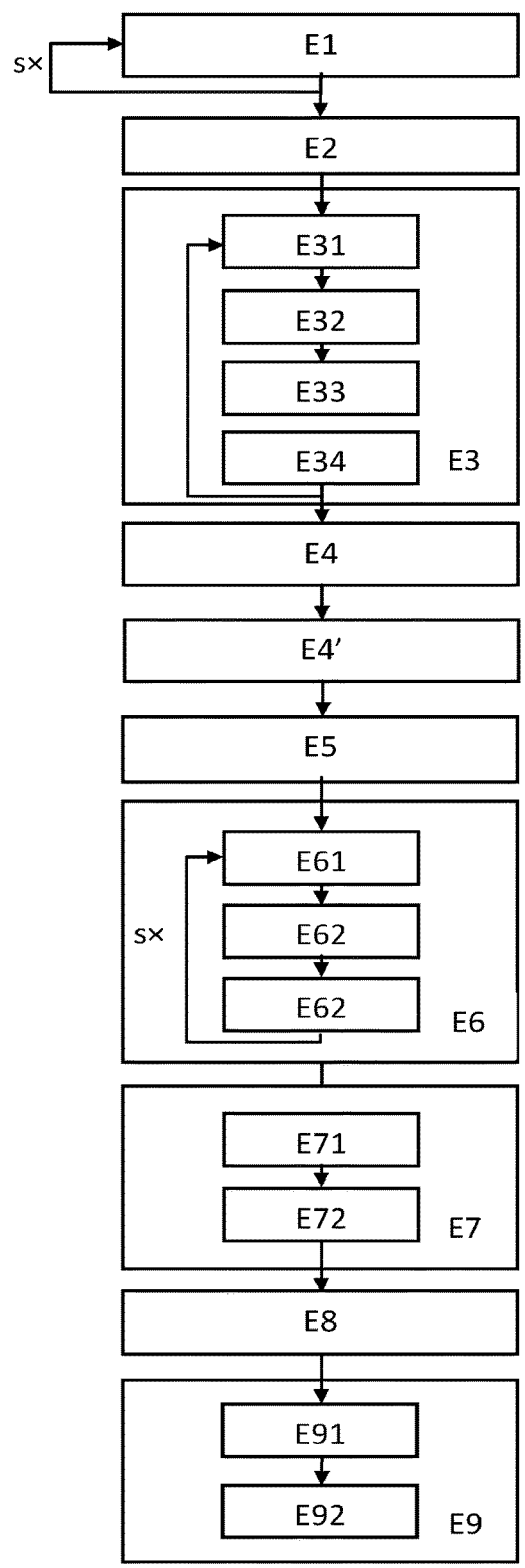
FIG. 3 is a flowchart presenting the main steps and sub-steps of the method according to the invention.

During step E1, the reference isotopes are isotopes which have been identified beforehand as being likely to be present in the medium to be characterised. Thus, the reference isotopes can be, for example, caesium isotope 137, 137Cs, cobalt isotope 60, 60Co, sodium isotope 22, 22Na, americium isotope 241, 241Am, or even cobalt isotope 57, 57Co. For each of the selected reference isotopes, at least one reference spectrum is made. As illustrated in the flowchart of FIG. 3, for S reference isotopes, step E1 is implemented S times in order to obtain at least one reference spectrum for each of the reference isotopes.

When it is contemplated to make several reference spectra for each of the reference isotopes, the reference spectra of a same reference isotope are combined together in order to obtain a single one. This combination of reference spectra can, for example and in a simple way, be made by averaging the reference spectra together. It can be noted alternatively that this combination can be made after the normalising step E2.

The reference spectra made are, during step E2, normalised so as to ensure an identification which is hardly sensitive to the amount of isotopes in the medium to be characterised. This normalisation can be made according to the following equation:

$$C_{nor}(x) = \frac{C(x)}{\sqrt{\int C(t)^2 dt}} \quad (1)$$

with $C_{nor}(x)$ the number of incidences normalised at energy x, C(x) the number of incidences at energy x, and $\int C(t)^2 dt$ the integral of the number of incidences squared on the entire energy spectrum range.

It can be noted that within a practical scope, the spectrum being digitised with a number K of samples, the equation (1) can be written as:

$$C_{nor}(k) = \frac{C(k)}{\sqrt{\sum_{i=0}^{K} C(i)^2}} \quad (2)$$

with k a given energy increment between 0 and K, Cnor(k) the number of incidences normalised for the increment k, C(k) the number of incidences for the increment k and $$\sum_{i=0}^{K} C(i)^2$$

the sum of the numbers of incidences squared on the entire measurement range.

Once the spectra are normalised, step E3 enables, for each of the reference isotopes, the measurement windows 111, 11n to be defined.

According to a first possibility of the invention, the measurement windows 111, 11n can be identical for all the reference spectra. According to this possibility, step E3 includes the following sub-steps:

defining a common window width 120,
defining N measurement points 101, 102, 103, 10n in said reference spectrum 10, N being an integer higher than or equal to 2, said measurement points 101, 102, 103, 10n being common to all the reference isotopes,
determining for each of the measurement points 101, 102, 103, 10n a measurement window 111, 11n centred on said measurement point 101, 102, 103, 10n and the width of which is the window width.

According to a second possibility of the invention, which is particularly advantageous, the different window widths of energy can be defined for each of the reference spectra. In order to take Compton effect into account, this spectrum width is preferentially defined as a function of the Compton peak width Cp and can be for example equal to this Compton peak width Cp.

The Compton peak, as illustrated in FIG. 1, can be detected on an energy spectrum by the steep slope of its falling edge. Thus, the Compton peak width is generally calculated by determining along the spectrum an energy range for which the average derivative is minimal, the width corresponding to the width of this slope. It is to be noted that in the example given in FIG. 1, the first peak visible at a low energy (at the window 111) is not related to Compton diffusion phenomenon and is not thus taken into account for measuring the Compton peak width.

Thus, in practice, a sub-step of determining a Compton peak width will consist in performing the following operations of:

defining an energy measurement pitch on which an average derivative can be determined,
determining along the spectrum the variation of the average derivative on the energy measurement pitch, the first peak being possibly excluded as a function of the type of measurement system 200 for measuring ionising radiations,
determining the minimum average derivative, this corresponding to the falling edge of the Compton peak, the width corresponding to the energy difference between the energy values located on either side of the minimum average derivative corresponding to a nullification of the derivative (that is a slope reversal).

Thus, step E3, according to this second possibility of the invention, can include the following sub-steps of:

E31 determining from the reference spectrum 10 of the reference isotope a Compton peak width Cp,
E32 determining from the value of the determined Compton peak width Cp a window width 120, the window width 120 being preferentially equal to the Compton peak width Cp,
E33 defining N measurement points 101, 102, 103, 10n in said reference spectrum 10, N being an integer higher than or equal to 2, said measurement points 101, 102, 103, 10n being common to all of the reference isotopes,
E34 determining for each of the measurement points 101, 102, 103, 10n a measurement window 111, 11n centred on said measurement point 101, 102, 103, 10n and the width of which is the window width 120.

Thus, for a point n corresponding to energy $E_{10n}$ and a window width 120 with an energy $E_{120}$, the corresponding measurement window corresponds to the energy range from $E_{10n}-E_{120/2}$ to $E_{10n}+E_{120/2}$.

As indicated in the flowchart of FIG. 3, steps E31 to E34 are made for each of the reference isotopes. For a number S of reference isotopes, steps E31 to E34 are repeating S times.

FIG. 1 illustrates the measurement of the Compton peak width Cp for a reference spectrum, here the spectrum of caesium isotope 137. As shown in the same figure, the measurement windows 111, 11n which have been defined with the N points 101, 102, 103, 10n have a window width equal to the measured Compton peak width Cp.

After the spectrum of the medium to be characterised is measured in step E4, the measured spectrum is then normalised in step E5. This normalisation of the measured spectrum can be made based on equations (1) and (2) in an identical way to normalising the reference spectra in step E2.

The normalised measured spectrum is then in step E6 compared with each of the reference spectra. For a given reference isotope, this comparison is made for each of its measurement windows 111, 11n determined in step E3 in order to determine for each of them a deviation value 21. Thus, with a number of measurement windows N, the comparison will enable for each of the isotopes an N-dimension deviation vector (not illustrated) to be obtained.

The comparison between the normalised measured spectrum and one of the normalised reference spectra can be made by means of the following sub-steps of:

E61 subtracting from the measured spectrum 20 the reference spectrum 10 of the reference isotope, E62 squaring the spectrum thus subtracted, E63 for each of the measurement windows 111, 11n, integrating on the measurement window 111, 11n the spectrum thus subtracted and squared so as to obtain the deviation value 21 for said measurement window 111, 11n.

These sub-steps E61 to E63 thus consist in calculating for each of the measurement windows of one of the reference isotopes the deviation value 21 by following the equation below:

$$D(n) = \int_{E_{10n}-E_{120}/2}^{E_{10n}+E_{120}/2} (C_{m\_nor}(x) - C_{nor}(x))^2 dx \qquad (3)$$

with $D(n)$ the deviation value 21 for said reference isotope for the measurement window n, $C_{m\_nor}(t)$ the number of incidences normalised at energy t for the measurement spectrum, $C_{nor}(t)$ the number of incidences normalised at energy t for the normalised reference spectrum, $E_{10n}$ the energy corresponding to the point n and $E_{120}$ the spectrum width determined for said reference isotope. More generally, the values $E_{10n}-E_{120/2}$ and $E_{10n}+E_{120/2}$ can be respectively replaced by low and high energy bounds of the measurement window n.

It can be noted in practice that, since the spectrum is digitised with a number of samples of energy K, the equation (3) can be written as:

$$D(n) = \sum_{i=\frac{n \cdot K}{N}-L/2}^{\frac{n \cdot K}{N}+L/2} (C_{m\_nor}(i) - C_{nor}(i))^2, \qquad (4)$$

with $D(n)$ the deviation value for said reference isotope for the measurement window n, $C_{m\_nor}(i)$ the number of incidences normalised at the energy increment i for the measurement spectrum, $C_{nor}(i)$ the number of incidences normalised at the energy increment i for the reference spectrum, N the number of windows and L the window width 120 in number of increments, the latter being an even integer.

Thus, this step E6 makes it possible for each reference isotope to define N deviation values between the corresponding reference spectrum 20 and the measured spectrum 10. Steps E61 to E63 are reproduced for each reference isotope. In this way, for a number of reference isotopes equal to S, steps E61 to E63 are made S times.

FIG. 1 illustrates the result of such a calculation of deviation values 21 for a reference spectrum 10 corresponding to caesium isotope 137 and an unknown measured spectrum 20, the deviation values 21 calculated being represented as a curve.

The deviation values 21 are calculated for each reference isotope, therefore step E7 makes it possible to determine the identity coefficient from the same.

This identity coefficient can be according to this embodiment of the invention, a dissimilarity coefficient MaxD determined for each of the reference isotopes from the deviation values $D(n)$. This dissimilarity coefficient MaxD can be for example equal to the maximum value reached by the calculated deviation values.

Mathematically, calculating the coefficient can be made according to the following equation:

$$\text{Max}D = \text{Max}\{D(1), \ldots D(n). \ldots, [[D(N)]] \ D(N)\} \qquad (5)$$

In this way, the reference isotope having the lowest dissimilarity coefficient will be that having a maximum deviation value which is minimum.

Thus, with such a dissimilarity coefficient MaxD, the detecting step E8 consists in identifying from the determined dissimilarity coefficients MaxD the smallest one, the isotope present in the medium to be characterised being possibly identified as being the reference isotope to which this smallest dissimilarity coefficient corresponds.

According to an alternative of the invention, the identity coefficient can be a resemblance coefficient MD determined for each reference isotope. Such a resemblance coefficient MD can be calculated in step E7 according to the following equation:

$$MD = \frac{1}{d + \text{Max}\{D(1), \ldots D(n), \ldots, D(N)\}}, \qquad (6)$$

d being a strictly positive calculation constant and preferentially with a relatively low value relative to the expected deviation values. Typically, d can be 0.001. This calculation constant makes it possible to avoid to have a dissimilarity coefficient calculation involving a division by 0.

According to this alternative, the isotope which has the highest resemblance coefficient MD will be that having the maximum deviation value which is minimum.

Thus, with such a resemblance coefficient MD, the detecting step E8 consists in identifying from the determined resemblance coefficients MD the highest one, the isotope present in the medium to be characterised being possibly identified as being the reference isotope to which this highest resemblance coefficient corresponds.

Once the isotope present in the medium is identified, the method can also make it possible to identify the other isotope(s) present in the medium to be characterised. In this case, step E8 of identifying the isotope is a step of identifying the major isotope and the method further includes a further step E9 of identifying other isotopes.

Such a step E9 includes the following sub-steps of:

E91 setting an identity coefficient threshold value,

E92 determining, by comparing the identity coefficients determined in step E7 to said identity threshold value, which are the other isotope(s) present in the medium to be characterised other than that identified in step E8.

According to a first possibility of the invention, the identity coefficient threshold value can be a predefined value. According to this first possibility, when the identity coefficient is the dissimilarity coefficient MaxD, the other isotopes identified as being present in the medium to be characterised are those having a coefficient higher than the predefined threshold value. According to the same possibility of the invention, when the identity coefficient is a resemblance coefficient MD calculated according to the equation (6), the other isotopes identified as being present in the medium to be characterised are those having a resemblance coefficient MD lower than the predefined threshold value.

According to a second possibility of the invention, the identity coefficient threshold value can be set based on an identity coefficient obtained for the reference isotope identified as being major in the medium to be characterised. According to this first possibility, when the identity coefficient is the dissimilarity coefficient, the identity coefficient threshold value can be set based on the following equation:

$$MaxD_{threshold} = 2 \cdot \min(MaxD), \quad (7)$$

with $MaxD_{threshold}$ the identity coefficient threshold value, MaxD all the dissimilarity coefficient values obtained for the reference isotopes, min(MaxD) being the dissimilarity coefficient of the reference isotope identified as the major isotope. The other isotope(s) identified as being present in the medium to be characterised 300 are those having a dissimilarity coefficient lower than the identity coefficient threshold value calculated from equation (7).

According to this same second possibility, when the identity coefficient is a resemblance coefficient MD calculated according to the equation (6), the identity coefficient threshold value can be set based on the following equation:

$$MD_{threshold} = \frac{\max(MD)}{2}, \quad (8)$$

with $MD_{threshold}$ the identity coefficient threshold value, MD all the resemblance coefficient values obtained for the reference isotopes, max(MD) being thus the resemblance coefficient of the reference isotope identified as the major isotope, the other isotopes identified as being present in the medium to be characterised are those having a resemblance coefficient higher than the identity coefficient threshold value $MD_{threshold}$ calculated from equation (8).

According to one possibility of the invention, the identification method can also be a method for detecting the presence of an isotope in the medium to be characterised. According to this possibility, as is illustrated in the flowchart of FIG. 3, the method includes a following step E4':

E4' detecting the presence of at least one isotope in the medium to be characterised.

This step E4' can consist, for example, in detecting from the measured spectrum the presence of a number of incidences higher than a predetermined threshold on the entire energy spectrum or on one or more given spectrum portions. In this manner, the identification of the isotope in the medium to be characterised will be made only when la presence of an isotope is established.

The order of the steps described above and in the flowchart of FIG. 3 can be different without departing from the scope of the invention. Thus, for example, steps E1, E2 and E3, in a conventional embodiment of the invention, are prior to steps E4 and E4'. It is also contemplatable, without departing from the scope of the invention, that they occur subsequently to steps E4 and E4'.

Likewise, the identity coefficient represents in the embodiment and preferentially, a dissimilarity coefficient which is maximum when the isotope to be identified is differentiated from a reference isotope. It is however also contemplatable, as shown by the alternative of the invention described above and without departing from the scope of the invention, that the identity coefficient is a resemblance coefficient which is minimum when the isotope to be identified is differentiated from a reference isotope. Thus, by identity coefficient, it should be meant a coefficient which makes it possible to characterise the dissimilarity or resemblance of the isotope to be identified relative to a given reference isotope regardless of the variation rule of this identity coefficient as a function of the dissimilarity between said isotope to be identified and the reference isotope.

Of course, for an optimum operation of the identification method, the measurements of scintillation spectra of steps E1 and E4 are made with a substantially identical configuration of the measurement system 200.

The invention claimed is:

1. An identification method of an isotope present in a medium to be characterized by a measurement system for measuring energy-resolved ionising radiations, the identification method comprising:
   a) measuring at least one reference spectrum for at least two reference isotopes;
   b) normalizing the reference spectra;
   c) delimiting for each reference isotope measurement windows in the reference spectrum of the isotope, width of the measurement windows being dependent on the reference spectrum of the reference isotope;
   d) measuring a measured spectrum on the medium to be characterized;
   e) normalizing the measured spectrum;
   f) for each reference isotope, delimiting in the measured spectrum measurement windows identical to those delimited for the reference isotope and calculating for each of the measurement windows a deviation value which is representative of the deviation between the measured spectrum and that of the reference isotope in the measurement window;
   g) for each reference isotope, determining from the deviation values calculated for the reference isotope an identity coefficient;
   h) identifying the isotope from the determined identity coefficients.

2. The identification method according to claim 1, wherein the measurement system uses low density scintillators or plastic scintillators, and
   wherein the c) delimiting measuring windows for each reference isotope comprises:
   c1) determining from the reference spectrum of the reference isotope a Compton peak width;
   c2) determining from the value of the determined Compton peak width a window width, or a window width equal to the Compton peak width.

3. The identification method according to claim 2, wherein the c1) determining a Compton peak width comprises:
   determining in the reference spectrum an energy range having a minimum derivative, the width of the energy range corresponding to the Compton peak width.

4. The identification method according to claim 1, wherein the c) delimiting measurement windows for each reference isotope in the reference spectrum of the isotope comprises, after at least one setting or determining a window width:
   c1) defining N measurement points in the reference spectrum, N being an integer higher than or equal to 2, the measurement points being common to all of the reference isotopes;
   c2) determining for each of the measurement points a measuring window centered on the measurement point and the width of which is the window width set beforehand.

5. The identification method according to claim 1, wherein the f) delimiting in the measured spectrum measurement windows and calculating for each of the measurement windows a deviation value includes for each of the reference isotopes comprises:

f1) subtracting from the measured spectrum the reference spectrum of the reference isotope;
f2) squaring the spectrum thus subtracted;
f3) for each of the measurement windows, integrating on the measurement window the spectrum thus subtracted and squared to calculate the deviation value for the measurement window.

6. The identification method according to claim 1, wherein the identity coefficient is a dissimilarity coefficient MaxD and the g) determining the dissimilarity coefficient MaxD comprises:
g1) calculating a dissimilarity coefficient MaxD relative to the reference isotope equal to the maximum value reached by the deviation values calculated for the reference isotope; and
the h) comprises:
h1) identifying from the determined dissimilarity coefficients MaxD the smallest one, the isotope present in the medium to be characterized being identified as being identical to the reference isotope to which the smallest dissimilarity coefficient corresponds.

7. The identification method according to claim 1, wherein the identity coefficient is a resemblance coefficient MD and wherein the g) determining the resemblance coefficient MID comprises:
g1) calculating a resemblance coefficient MD relative to the reference isotope equal to the inverse of the maximum value reached by the deviation values calculated for the reference isotope to which a strictly positive calculation constant has been added beforehand;
the h) comprises:
h1) identifying from the determined resemblance coefficients the greatest one, the isotope being identified as being identical to the reference isotope to which the greatest resemblance coefficient corresponds.

8. The identification method according to claim 1, wherein the h) identifying the isotope comprises identifying the major isotope, and further comprising i) identifying at least one other isotope.

9. The identification method according to claim 8, wherein the i) identifying at least one other isotope comprises:
i1) setting an identity coefficient threshold value;
i2) determining, by comparing the identity coefficients determined in the g) to the identity coefficient threshold value, which are the at least one other isotope present in the medium to be characterized other than that identified in the h).

10. The identification method according to claim 1, further comprising:
i) detecting presence of at least one isotope in the medium to be characterized.

11. An identification device for identifying isotopes, which is adapted to identify an isotope in a medium to be characterized, and comprising:
a measurement system for measuring energy-solved ionizing radiations configured to measure energy spectra;
a control and monitor unit configured to control and monitor the measurement system;
wherein the control and monitor unit is configured to control the measurement system to perform an identification method according to claim 1.

12. A non-transitory computer readable medium storing thereon a computer program including instructions for implementing the method according to claim 1, when the program is implemented by a computer forming a control and monitor unit of a measurement for measuring energy-solved ionizing radiations configured to measure energy spectra.

13. An identification method of an isotope present in a medium by a measurement system for measuring energy-resolved ionising radiations, the identification method comprising:
a) measuring at least one reference spectrum for at least two reference isotopes;
b) normalizing the reference spectra;
c) delimiting for each reference isotope measurement windows in the reference spectrum of the isotope, a width of the measurement windows being dependent on the reference spectrum of the reference isotope;
d) measuring a measured spectrum on the medium to be characterized;
e) normalizing the measured spectrum;
f) for each reference isotope, delimiting in the measured spectrum measurement windows identical to those delimited for the reference isotope and calculating for each of the measurement windows a deviation value which is representative of the deviation between the measured spectrum and that of the reference isotope in the measurement window;
g) for each reference isotope, determining from the deviation values calculated for the reference isotope an identity coefficient;
h) identifying the isotope from the determined identity coefficients,
wherein the c) delimiting measuring windows for each reference isotope comprises:
c1) determining from the reference spectrum a feature of the spectrum;
c2) determining from the value of the feature of the spectrum the width of the measurement windows.

\* \* \* \* \*